United States Patent
Klemm et al.

(10) Patent No.: US 6,216,237 B1
(45) Date of Patent: Apr. 10, 2001

(54) DISTRIBUTED INDIRECT SOFTWARE INSTRUMENTATION

(75) Inventors: Reinhard Klemm, North Plainfield; Navjot Singh, Morristown; Timothy Tsai, North Plainfield, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/100,827

(22) Filed: Jun. 19, 1998

(51) Int. Cl.[7] .................................................. G06F 11/13
(52) U.S. Cl. ................................................ 714/38; 714/35
(58) Field of Search ................................... 714/38, 39, 43, 714/47, 13, 25, 26, 31, 34, 35, 46; 395/705, 704; 711/209, 211

(56) References Cited

U.S. PATENT DOCUMENTS

| | | | |
|---|---|---|---|
| 5,335,344 | * 8/1994 | Hastings | 395/575 |
| 5,465,258 | * 11/1995 | Adams | 395/700 |
| 5,539,907 | * 7/1996 | Srivastava et al. | 395/700 |
| 5,790,858 | * 8/1998 | Vogel | 395/704 |
| 5,832,271 | * 11/1998 | Devanbu | 395/705 |
| 5,920,689 | * 7/1999 | Berry et al. | 395/184.01 |
| 5,960,198 | * 9/1999 | Roediger et al. | 395/704 |
| 6,079,032 | * 6/2000 | Peri | 714/38 |

* cited by examiner

Primary Examiner—Nadeem Iqbal
(74) Attorney, Agent, or Firm—Ryan, Mason & Lewis, LLP

(57) ABSTRACT

The invention provides a software instrumentation tool operative to control the execution of a target program, and to execute user-specified instrumentation actions upon occurrence of corresponding user-specified events during target program execution. Advantageously, the instrumentation tool permits the instrumentation actions to be implemented without modification of the target program code, and can be used to provide any desired type of instrumentation on any target program. In an illustrative embodiment, the instrumentation tool includes a frontend portion which provides a creation graphical user interface (GUI) to the tool, and a backend portion which controls execution of the target program and executes the user-specified actions. The frontend portion also includes, for a given target program, a created GUI which is created by a user for providing selected instrumentation functions for the given target program. The frontend and backend portions of the instrumentation tool may each be running on a different machine, or both may run on the same machine. The invention may be used in a wide variety of applications, including application program modification and management, fault tolerance, real-time collaboration, process monitoring, software rejuvenation and graphical interface generation.

33 Claims, 8 Drawing Sheets

PCP COMMAND CODE CATEGORIES

| RANGE | CATEGORY |
|---|---|
| 001-099 | GENERAL COMMANDS |
| 100-299 | BREAKPOINT COMMANDS |
| 100-199 | SET BREAKPOINT COMMANDS' |
| 200-299 | SET BREAKPOINT ACTIONS |
| 300-399 | NOTIFICATION COMMANDS |
| 400-499 | ACKNOWLEDGMENT COMMANDS |
| 500-599 | FAULT-TOLERANCE COMMANDS |

CreatedGUI
General  Breakpoints  Fault Tolerance

Source Listing

```
307 static void clock_tic(client_data,id)
308     XtPointer client_data;
309     XtIntervalId*id;
310 {
311     Clock Widget 2 = (ClockWidget)client_data;
312     struct tm tm;
313
314     long time_value;
315     /* Since time_ptr will be passed to strftime, it needs to have memory
316      * already allocated for it.
317      * tkt -- 4-6-95
318     char *time_ptr;
319     */
320 #define BUFSIZE 512
321 char time_ptr[BUFSIZE];
322
323     register Display *dpy = XtDisplay(w);
324     register Window win = XtWindow(w);
325
326     if (id || !w-> clock.interval_id)
327         w-> closk.interval_id =
328         WtAppAddTimeOut(XtWidgetToApplicationContext((Widget)w),
```

FIG. 3A

DISTRIBUTED INDIRECT SOFTWARE INSTRUMENTATION

RELATED APPLICATION

The present invention is related to the invention described in U.S. patent application Ser. No. 09/100,826 entitled "Fault Tolerance Via N-Modular Software Redundancy Using Indirect Instrumentation," filed concurrently herewith in the name of inventor Timothy Tsai, and assigned to the assignee of the present invention.

FIELD OF THE INVENTION

The present invention relates generally to computing systems, and more particularly to software instrumentation techniques for use in such systems.

BACKGROUND OF THE INVENTION

Software instrumentation refers generally to the process of modifying a program to include additional code, referred to as instrumentation code, which is designed to provide various types of monitoring and analysis of program performance during program execution. Instrumentation also includes other activities such as modifications for fault tolerance, e.g., checkpointing, and fault injection. Instrumentation thus typically involves some modification of a target program to alter or add functionality. For example, instrumentation code may be used to provide indications as to whether or not particular branches are taken when a program is executed with a given set of inputs, or to interrupt a processor during execution in order to aid in fault location. Existing software instrumentation methods can be broadly categorized as static methods and dynamic methods.

Static methods modify program code before the start of code execution, while dynamic methods delay modifications until the program is loaded into memory. Static software instrumentation involves the direct modification of code and can be performed at various stages of code development. One very common form of instrumentation is the use of the cpp C-language preprocessor, which performs automatic source code instrumentation. Other examples of source code instrumentation tools include the FAUST fault injection tool, as described in B.-H. Suh et al., "FAUST—fault injection based automated software testing," Proccedings of the 1991 Systems Design Synthesis Technology Workshop, Silver Spring, Md., September 1991, and the Motlira software mutation testing tool, as described in B. J. Choi et al., "The mothra tools set," Proceedings of the 22nd Hawaii International Conference on Systems and Software, pages 275–284, Kona, Hi., January 1989.

Static instrumentation can also be performed on assembly code. Optimizers embedded in compiler backends are an example of assembly code instrumentation. Perhaps the most easily recognizable form of static software instrumentation is performed on binary code. Tools such as the pixie profiling tool described in "RISCompiler and C Programmer's Guide," Computer Systems, Inc., 930 Arques Ave., Sunnyvale, Calif. 94086, 1986, and the FIAT fault injection tool described in J. H. Barton et al., "Fault injection experiments using FIAT," IEEE Transactions on Computers, 39(4):575–582, April 1990, directly modify the executable image of their target applications. Other tools, such as the libft checkpointing tool described in Y. Huang and C. Kintala, "Software fault tolerance in the application layer," Software Fault Tolerance, Michael Lyu, ed., ch. 10, Wiley, 1995, incorporate additional code into the original code by linking the original code with new libraries or object code files. In fact, the process of linking object files may also be viewed as a form of software instrumentation, because the object files themselves are modified to create a single executable program.

As noted above, dynamic software instrumentation methods, in contrast to static methods, do not perform any modifications until the program has been loaded into memory. As the program executes, the instrumentation code is executed in parallel, either as a separate process or thread, or as in-lined code. This instrumentation code allows the program's dynamic state to be observed and modified. A number of different dynamic instrumentation methods exist. The environment external to the program can be modified, as with the 3-D file system described in G. S. Fowler et al., "A user-level replicated file system," USENIX Conference Proceedings, pages 279–290, Cincinnati, Ohio, Summer 1993. The operating system can be directly modified, as with the FTAPE fault injection tool described in T. K. Tsai et al., "An approach towards benchmarking of fault-tolerant commercial systems," Proceedings of the 26th International Symposium on Fault-Tolerant Computing, pages 314–323, Sendai, Japan, June 1996, or the state of the operating system or system calls can be monitored, as with the UNIX strace utility. The process of linking dynamic shared libraries can be modified to substitute alternate instrumented libraries, such as with the REPL file duplication software described in the above-cited Y. Huang and C. Kintala reference. Finally, the execution of the program can be directly controlled via a software controller with the ability to selectively interrupt the program and execute instrumentation code, as in the FERRARI fault injection tool described in G. A. Kanawati et al., "FERRARI: A flexible software-based fault and error injection system," IEEE Transactions on Computers, 44(2):248–260, February 1995.

The conventional static and dynamic instrumentation techniques described above have a number of drawbacks. For example, many of the techniques are implemented in a "direct" manner, i.e., in a manner which requires changes to either source code or executable code of an instrumented target program. This unduly increases the complexity of the instrumentation process, is unsuitable for use with certain types of target programs, and fails to provide adequate support for many increasingly important distributed computing applications. Other techniques, such as the above-noted FERRARI fault injection tool, are hard-coded to provide only certain specific types of instrumentation.

SUMMARY OF THE INVENTION

The invention provides a general-purpose software instrumentation technique, referred to as "indirect instrumentation," in which execution of a target program is directed by a controller. The controller operates in conjunction with other processes and/or threads to instrument the target program by executing user-specified actions upon occurrence of user-specified trigger events. Advantageously, the invention can provide any desired type of instrumentation on any target program, and without modification of the source code or executable code of the target program. An illustrative embodiment of the invention is in the form of an instrumentation tool that includes a frontend portion and a backend portion. The frontend and backend portions of the tool may each be running on a different machine, or alternatively both portions may run on the same machine. The frontend portion includes a creation graphical user interface (GUI) which allows a user to graphically design a created GUI with customized instrumentation operations tailored to a given target program. The frontend portion may be implemented in, for example, Java, and executed in any Java-enabled web browser. The backend portion, which may be implemented in C++, controls the execution of the target program in accordance with user-specified actions and other instrumentation functions. The frontend and backend communicate over a communication medium which may utilize conventional TCP/IP messaging.

In accordance with the invention, a given target program is instrumented by controlling its execution and implementing user-specified actions in response to user-specified trigger events which occur during target program execution. The user-specified actions and events may be specified in the creation GUI of the above-noted frontend portion. A controller directing the execution of the target program operates in conjunction with a number of other processes and/or threads to execute the user-specified instrumentation actions upon occurrence of the designated trigger events. The controller and these other processes and/or threads may be elements of the above-noted backend portion. Information regarding the user-specified actions and triggers is communicated from the user interface of the frontend portion to the controller and other processes and/or threads of the backend portion, and is used to provide the desired inst Lamentation without modification of target program code. The processes and/or threads may also be used to implement counters for monitoring a characteristic of a user-specified action. Exemplary user-specified actions include: (i) altering execution of the target program; (ii) altering a value of a target program variable; (iii) sending output of the target program to the frontend portion; (iv) starting at least one additional program; (v) calculating a rate of occurrence for a given event relating to the target program; (vi) sending a message to the frontend portion when a given event relating to the target program occurs; and (vii) modifying a target program variable based on usage of a set of operating system resources. Exemplary user-specified trigger events include: (i) an update of a target program variable; (ii) execution of a target program instruction; and (iii) expiration of a timer.

Indirect instrumentation in accordance with the invention provides substantially improved flexibility and performance by allowing the instrumentation itself to be easily altered, added, or deleted as the target program executes, without modification of target program source code or executable code. This greatly increases the convenience for the user and decreases the amount of time needed for the user to perform the instrumentation. The indirect nature of the instrumentation of the invention also permits the instrumentation of certain types of target programs which generally cannot be instrumented using conventional software instrumentation techniques. These target programs include, for example, "legacy" software that either has no available source code or is very difficult to understand, and programs that are already executing and cannot be terminated, instrumented, and restarted. The invention also makes possible numerous distributed computing applications, including application program modification and management, fault tolerance, real-time collaboration, process monitoring, software rejuvenation and graphical interface generation.

BRIEF DESCRIPTION OF THE DRAWINGS

FIGS. 3A–3B and FIG. 4 show creation and created graphical user interfaces (GUIs), respectively;

DETAILED DESCRIPTION OF THE INVENTION

The present invention will be illustrated below in conjunction with an exemplary distributed computing system. It should be understood, however, that the invention is not limited to use with any particular type of computing system, but is instead more generally applicable to any computing environment or application in which it is desirable to perform software instrumentation in a more convenient and efficient mainer than is possible using conventional approaches. The disclosed techniques can be utilized with computers or other machines arranged in local area networks, wide area networks, metropolitan area networks, intranets, extranets and global networks such as the Internet. The term "program" as used herein is intended to include any type of instruction, code, process, thread or the like which runs on a computer or other machine in a computing system. The term "distributed system" is intended to include any system which includes two or more computers or other machines. The term "machine" as used herein should be understood to include a computer, a workstation or any other type of data processing device as well as various components of such devices. The term "remote machine" as used herein refers generally to any computer, workstation or other data processing device which executes a process on behalf of another machine. A remote machine in accordance with the invention therefore need not be geographically remote from the host machine. The term "indirect instrumentation" refers to instrumentation that can be implemented without directly altering either the source code or the executable code of an instrumented target program. An "instrumentation tool" refers generally to any software program which implements at least a portion of an instrumentation process. The term "controller" refers generally to any software program or other mechanism which provides one or more of the functions described herein as associated with a backend of an instrumentation tool, and may be used to designate the entire backend as well as an element or elements of the backend.

Figures 1, 8:
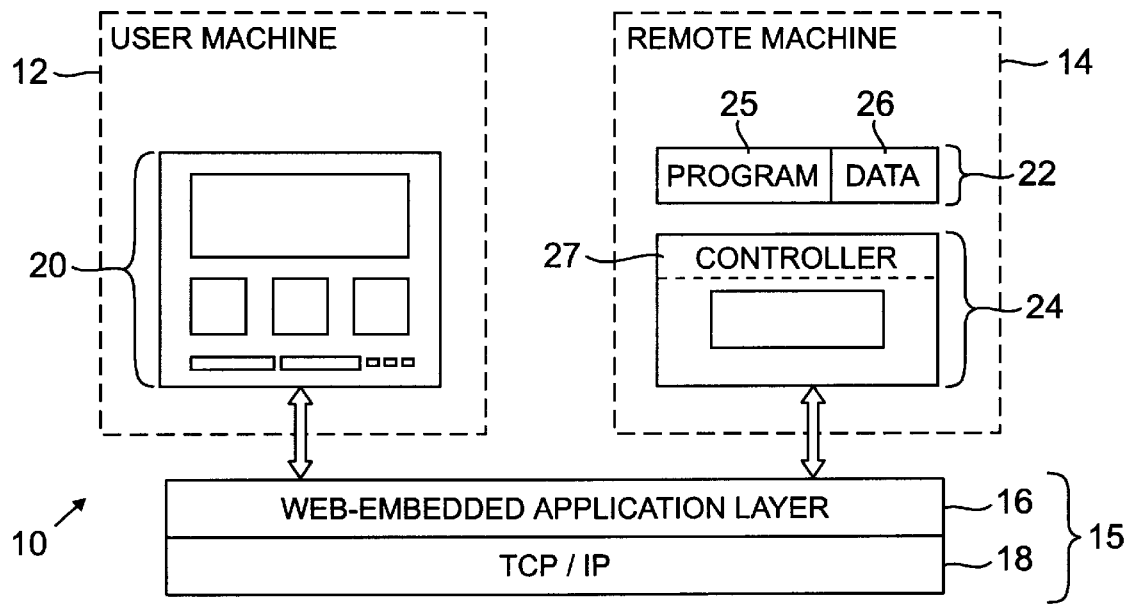
FIG. 1 is a block diagram of an illustrative embodiment of the invention.
FIG. 8 shows exemplary command code categories for providing instrumentation in accordance with the invention.

FIG. 1 illustrates the general architecture of an indirect instrumentation software tool in accordance with one possible embodiment of the invention. This embodiment is implemented in a distributed system 10 which includes a user machine 12 and a remote machine 14. The user machine 12 and the remote machine 14 communicate via a communication medium 15 which in this embodiment includes a web-embedded application layer 16 and a conventional Transmission Control Protocol/Internet Protocol (TCP/IP) layer 18. The web-embedded application layer 16 may be any suitable message-passing mechanism configured to operate with the TCP/IP layer 18. The operation of layers 16 and 18 will be described in greater detail in conjunction with FIG. 7 below. Other types of communication media may be used in alternative embodiments. Moreover, other embodiments of the invention may be implemented using a single machine, or more than two different machines.

The indirect instrumentation software tool includes a "frontend" portion and a "backend" portion. The frontend is implemented on the user machine 12 and includes, among other elements, a "creation" graphical user interface (GUI) 20. The frontend may be, for example, one or more Java applets that can be executed on a Java-enabled computer or other suitable machine. The backend is implemented on the remote machine 14 and includes two software processes: a target program 22, i.e., the program that is to be instrumented, and backend software 24 that performs the instrumentation on the target program 22. As will be described in greater detail below, the backend software 24 may be comprised of multiple processes and threads. Within target program 22, element 25 represents the control-flow execution of the target program, and element 26 represents the data space of the target program. The backend software 24 includes a controller 27. The frontend provides an interface between the user and the backend software 24 which controls the target program 22. The GUI 20 of the frontend is preferably point-and-click driven and has pull-down menus, windows, lists, buttons, and text fields, as will be described in greater detail in conjunction with FIGS. 3A–3B.

The controller 27 running on remote machine 14 directs the control flow of the target program 22 and provides observability into the internal state of the program 22 as it executes. The controller 27 has the ability to direct the target program to commence, suspend, and terminate execution at any point. It also is able to view and manipulate the entire data space of the target program, including static and dynamic data and processor registers. The controller 27 may include a debugger, e.g., a conventional gdb or dbx debugger, or a low-level facility provided by the operating system, e.g., a conventional ptrace facility or the /proc file system in UNIX, which serves as the part of the backend that directly controls and communicates with the target program 22. It will be assumed that in the illustrative embodiment the controller 27 includes the gdb debugger as described in R. M. Stallman, "Debugging with GDB: the GNU Source-Level Debugger," 4.12 edition, January 1994, which is incorporated by reference herein. Although alternatives exist for use in the controller 27, the gdb provides the desired functionality and has been extensively tested and ported to many platforms.

The controller 27 allows indirect instrumentation to be automated, such that the amount of hand-coded instrumentation code is reduced to the greatest extent possible. The user of the instrumentation tool interacts primarily with the GUI 20 of the frontend, while the instrumentation is performed by the controller 27 of the backend. The distributed configuration of the indirect instrumentation software tool expands its utility beyond conventional software instrumentation and makes possible the implementation of distributed software fault tolerance, real-time collaboration, distributed graphical interfaces, and numerous other applications.

It should be noted that although the instrumentation tool in the illustrative embodiment includes a controller which has a debugger as one of its components, the tool itself provides additional capabilities typically not found in a debugger. A debugger is generally capable of performing many low-level tasks such as managing breakpoints, executing debugger commands when breakpoints are encountered, and printing and modifying the values of variables. In contrast, the instrumentation tool in the illustrative embodiment configures the debugger in the controller 27 to perform all the tasks needed in an automated, transparent, and distributed manner. In addition, the instrumentation tool adds the capability of incorporating and executing user-specified code in conjunction with the target program 22 to perform tasks that a debugger alone is unable to do. The instrumentation software tool also provides other unique features, such as, for example, an automated feedback mechanism that triggers the aforementioned user-specified code when a designated event occurs.

Figure 2:
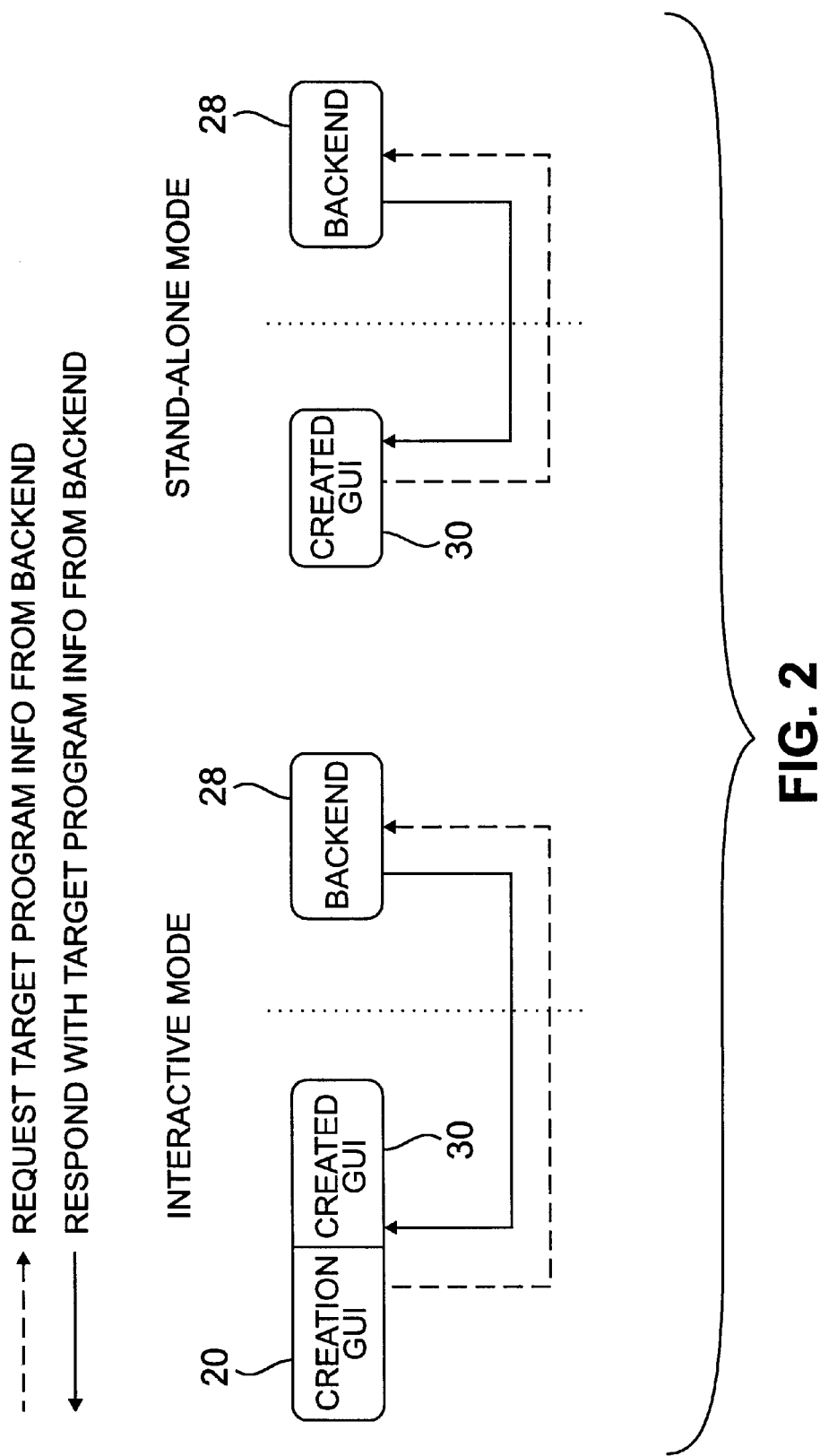
FIG. 2 illustrates different operating modes supported by the FIG. 1 embodiment.

FIG. 2 illustrates two operating modes of the instrumentation tool of FIG. 1. As previously noted, the instrumentation tool supports the instrumentation of a target program 22 by providing a creation GUI 20. In an interactive mode of operation, the creation GUI 20 allows the user to create a customized "created" GUI 30, which then connects to a backend 28 as shown. Both the creation GUI 20 and the created GUI 30 are associated with the frontend portion of the instrumentation tool, and thus run on the user machine 12 in the illustrative embodiment. The backend 28 includes the backend software 24 with controller 27 and is implemented on the remote machine 14. While the user interacts with the creation GUI 20, the created GUI 30 is built in a separate window that can be immediately reviewed and modified if necessary. The creation GUI 20 requests target program information from the backend 28, as indicated by the dashed line, and the backend 28 responds to the created GUI 30 with the requested information, as indicated by the solid line. Once the user is satisfied with the instrumentation and the created GUI 30, a final version of the created GUI 30 can be generated for a stand-alone mode of operation in which that version can be run independently of the creation GUI 20. In this stand-alone mode, the created GUI 30 directly requests target program information from the backend 28 during target program execution, as indicated by the dashed line, and the backend 28 responds to the created GUI 30 with the requested information, as indicated by the solid line. A user will typically first enter the interactive mode to tailor the created GUI 30, and then subsequently run the resulting created GUI 30 in the stand-alone mode.

Figure 3B:
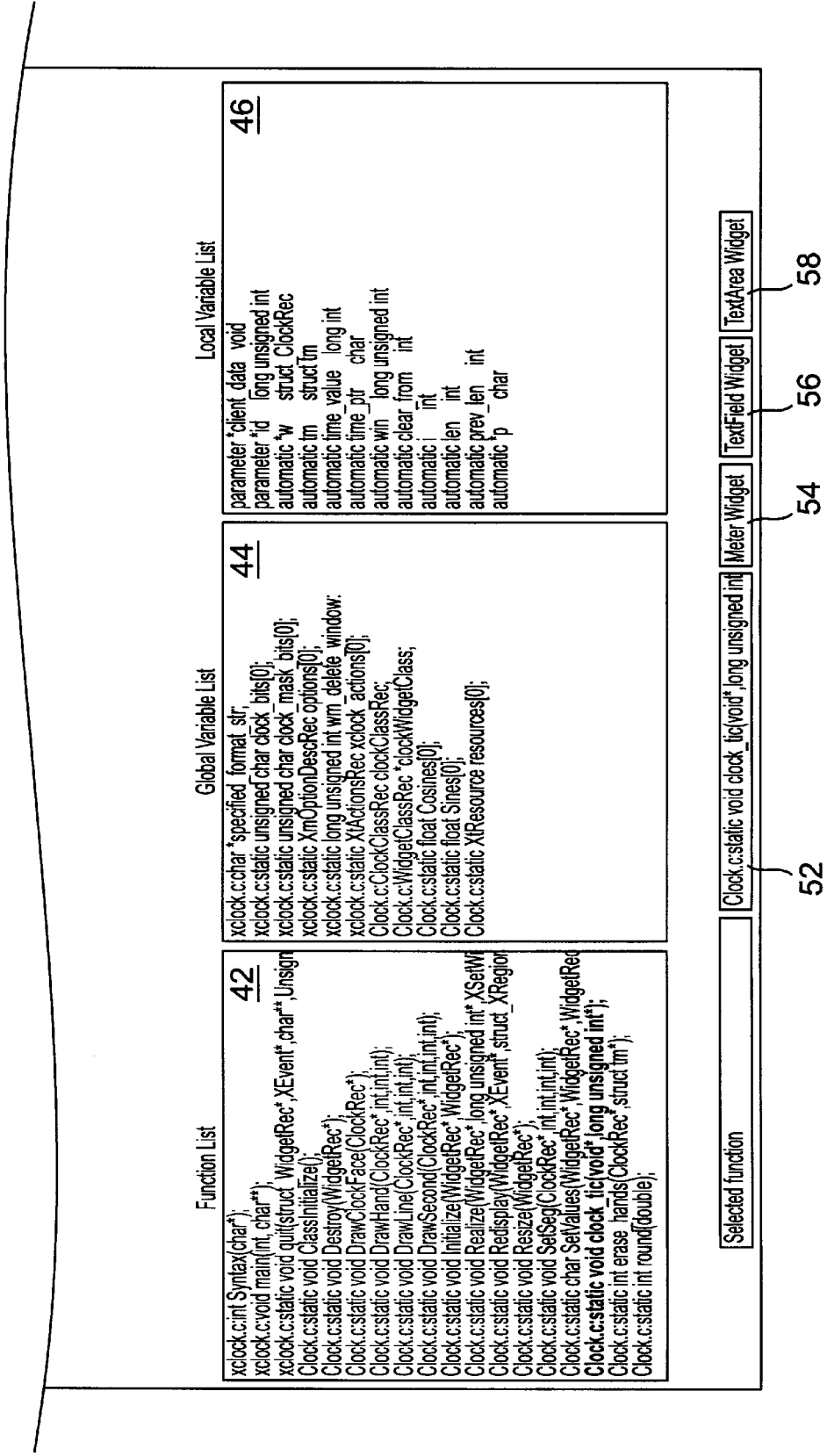
Figure 4:
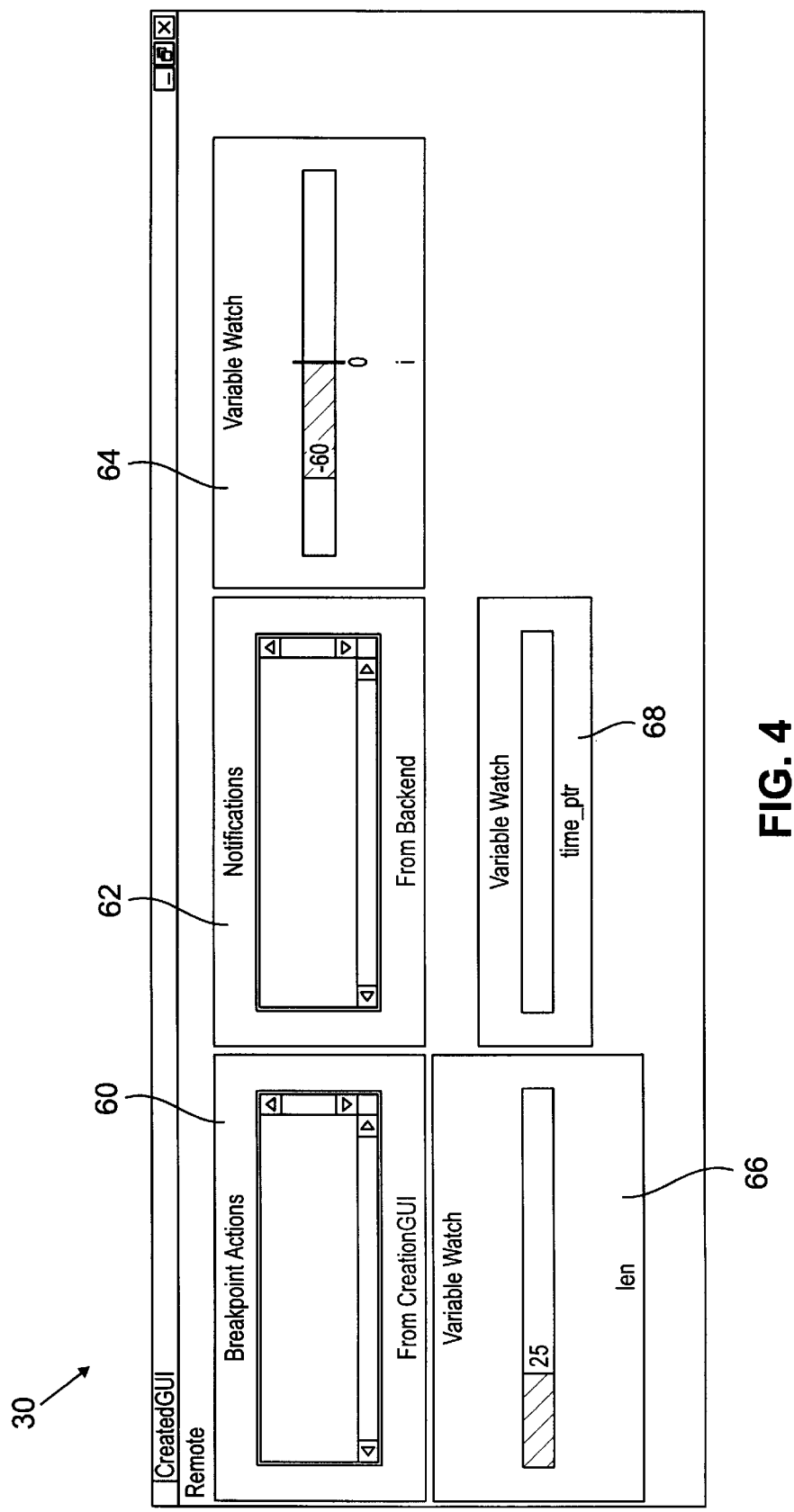

FIGS. 3A–3B and FIG. 4 show examples of a creation GUI 20 and a created GUI 30, respectively, in accordance with the invention. The creation GUI 20 of FIGS. 3A–3B includes a source listing window 40, a function list 42, a global variable list 44 and a local variable list 46. A given function selected from the function list 42 is highlighted in the list 42 and displayed in a text field 52 as shown. The corresponding global and local variables for the selected function are displayed in the respective global variable list 44 and local variable list 46, while the source code for the function is displayed in the source listing window 40. A number of buttons are provided, including a meter widget button 54, a text field widget button 56 and a text area widget button 58. These buttons allow a user to specify particular widgets which will appear in the created GUI 30. For example, the meter widget button 54 may be used to specify a particular variable to be monitored in a visually perceptible format in the created GUI 30. One such format is a horizontal bar whose length is proportional to the value of the associated variable. Other types of widgets include, for example, pie chart widgets, time-line widgets, etc. These and other widget classes can be included in a basic graphical widget library that can be extended by the user.

Although not illustrated in FIGS. 3A–3B, a number of pull-down menus may be provided in the creation GUI 20. For example, the creation GUI 20 may include a menu for commands related to the target program as a whole, such as commands to load, run, interrupt, interrupt periodically, or terminate the target program. Another menu may provide instrumentation commands, such as commands for setting breakpoints associated with source code lines or commands to specify trigger mechanisms for user-defined functions.

The creation GUI 20 thus allows a user to select and configure instrumentation operations provided by the instrumentation tool. For example, if a particular instrumentation command selected from a pull-down menu requires user-specified parameters, the user can enter these parameters via a keyboard into a corresponding text field. The target program information displayed in the windows and lists of the creation GUI 20 may be requested by creation GUI 20 from the backend, as previously described.

The created GUI 30 of FIG. 4 includes a window 60 for listing breakpoint actions specified by the user in the creation GUI 20, and a window 62 for listing notifications received from the backend in response to the breakpoint actions or other user-specified instrumentation. The created GUI 30 further includes a set of variable watch windows 64, 66 and 68 for specifying the current status of selected variables i, len and time_ptr, respectively. It should be noted that the selected variables are illustrative for the chosen target program, and many other types of variables could be monitored. The variable watch windows are examples of meter widgets that can be specified using the meter widget button 54 in the creation GUI 20 of FIG. 3. The created GUI 30 thus provides a display of the user-specified instrumentation generated from the creation GUI 20. As previously noted, the created GUI 30 may be run in a stand-alone mode in which it interacts with the backend to obtain the necessary information regarding the target program as the program executes. A user thus uses the instrumentation-generation features of the creation GUI 20 to generate a customized created GUI 30 which interacts with the backend to provide the target program information required for the instrumentation.

Figure 5:
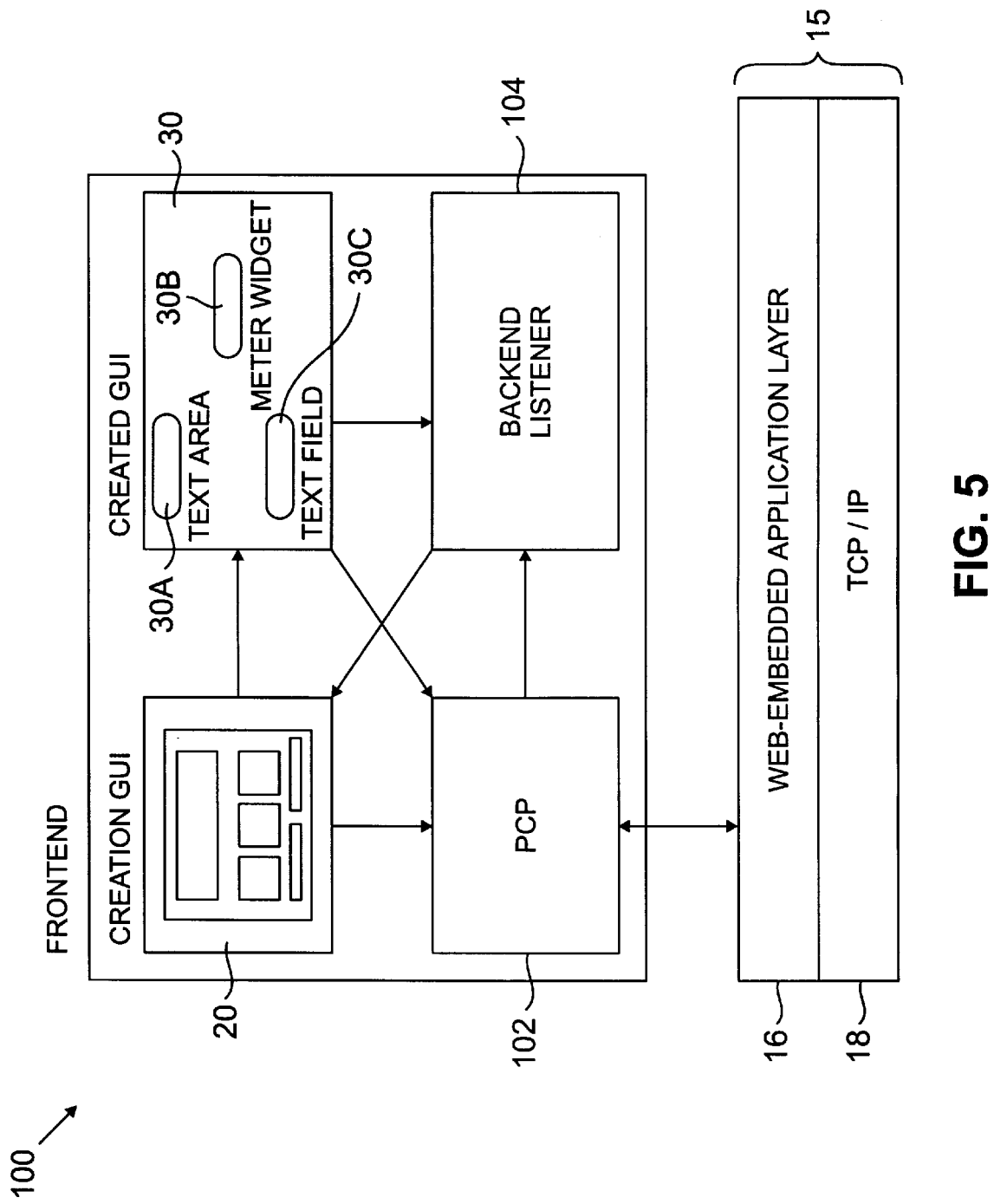
FIGS. 5 and 6 show more detailed views of the frontend and backend portions, respectively, of the FIG. 1 embodiment.

FIG. 5 illustrates an exemplary frontend 100 of the instrumentation tool in greater detail. The frontend 100 includes the creation GUI 20 and the created GUI 30 as previously described. The created GUI 30 includes text area code 30A, meter widget code 30B and text field code 30C. The sets of code 30A, 30B and 30C are responsible for generating corresponding portions of the graphical display of the created GUI 30 as shown in FIG. 4. The graphical output of the sets of code 30A, 30B and 30C will be displayed as part of the created GUI 30 depending on whether the user decides to use a particular widget as part of the GUI 30. The frontend 100 further includes a Prism Communications Protocol (PCP) element 102 for implementing communications between the frontend 100 and one or more backends, and a backend listener 104 for receiving communications from the one or more backends via the communication medium 15.

Figure 6:
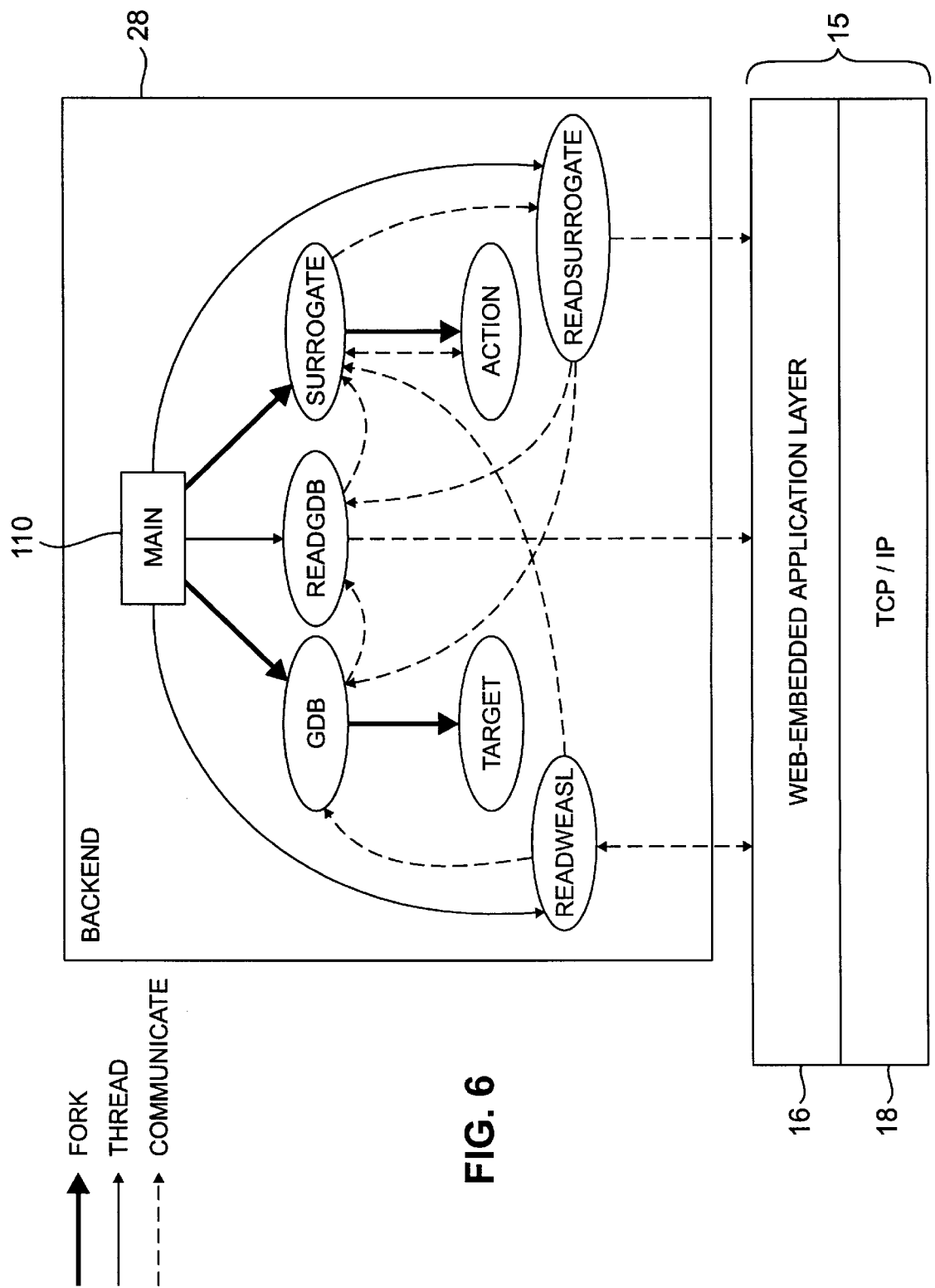

FIG. 6 shows an exemplary backend 28 in greater detail. In order to handle the variety of responsibilities required of it, the backend is partitioned into several different components. These components generally execute in parallel, with some executing as forked processes and others executing as threads. Whenever possible, threads are used, except when the components must fork off additional processes themselves. Multiple threads can form a single process, since they share the same memory space. In FIG. 6, thick solid arrows indicate a fork of a given process, thin solid arrows indicate a thread of a given process, and dashed arrows indicate communication. The backend 28 in this embodiment includes a main process 110 which controls its operation. A debugger process gdb and another process surrogate are started as forks from the main process, and readgdb, readweasl and readsurrogate are threads of the main process. The readgdb thread is responsible for reading information from the gdb process, the readweasl thread is responsible for reading information from the communication medium 15, and the readsurrogate thread is responsible for reading information from the surrogate process. The gdb process controls debugger operations undertaken by the backend 28, as illustrated by a target process started as a fork from the gdb process. The surrogate process controls actions undertaken by the backend 28, as illustrated by an action process started as a fork from the surrogate process. These backend actions will be described in greater detail below.

As previously noted, the backend 28 serves as a controller for the target program. All requests from the frontend 100 are handled by the backend, and all output from the target program 22 to the frontend is transfected by the backend. Thus, the backend in this embodiment is the only interface between the frontend and the target program. The operations that the backend performs on the target program constitute the basis of indirect instrumentation. In addition to serving as the interface between the target program and the frontend, the backend also performs other important functions. First, backend actions can be specified by the user for execution whenever a desired trigger condition is encountered. These actions perform calculations, alter the execution of the target program, including target program variable values, send output to the frontend, start up additional programs, or perform other functions. In addition to implementing actions, the backend may also contain its own internal counters, which can be used as variables in addition to the target program variables. These backend actions and counters are very powerful and provide the ability to alter the execution of the target program.

A number of actions supported by the backend 28 will now be described. In addition to control of the target program via explicit controller commands, e.g., gdb commands, the backend performs several other functions. The term "action" as used herein refers to a user-specified task that is performed by the backend. The following are examples of possible actions: (1) calculate the rate of occurrence for a given event, such as when a target program variable is updated; (2) reset the value of a target program variable when the value reaches a threshold level; (3) send mail to the user when an event occurs, such as when the rate of occurrence for another event (see item 1) exceeds a threshold level; (4) monitor the usage of a set of operating system resources, e.g., CPU utilization, memory usage, and network traffic, and modify a target program variable based on the monitored data. Actions are generally executed as separate processes and may be implemented as interpreted scripts, e.g., shell, PERL, awk, or Java scripts, or as native executables. The frontend can be configured to allow the user to write the actions explicitly via the frontend creation GUI 20 and then to send the action files to the backend. Alternatively, the action files can be manually placed on the remote machine on which the backend resides.

Based on commands from the frontend, the backend determines when actions should be triggered, i.e., when actions should begin execution. Exemplary action triggers include the following: (1) the update of a target program variable; (2) the execution of a target program instruction (this trigger may be further limited by a conditional expression that includes target program variables); and (3) the expiration of a timer. Each action may have its own list of triggers. When the trigger for an action occurs, then the action is started by the backend. After the action is started, it executes until it determines that it is no longer needed. Thus, some actions may be written to execute briefly and then disappear. Other actions may be started up and continue execution until the backend is terminated. If an action is triggered again while it is still executing, then a second action need not be started. However, the backend generally sends new input to the action for each trigger, whether the action is started or has already been started in the past.

In order to be most useful, actions should have some interaction with the backend and target program. The backend can send input to an action whenever the action is triggered. This input can include, for example, target program variable values, constant strings, and values of backend counters. Actions can generally produce at least the following different types of output that are sent to the backend: (1) strings that are forwarded by the backend to the frontend (these strings may be displayed by the frontend in a graphical widget); (2) commands that update the value of a backend counter; and (3) commands that are intended to change the execution or state of the target program. Of course, actions can also provide other types of output.

Since actions interact closely with the backend and the target program, actions can be either synchronous or asynchronous in terms of their execution relative to the backend. A synchronous action will pause the backend and target program after an action is triggered until that action sends a sync signal to the backend. A synchronous action may be needed in certain situations where the action either modifies a backend counter or changes the execution or state of the target program. For example, if an action resets the value of a target program variable when the variable reaches a threshold value, then the target program must not be allowed to continue execution until that variable is reset. In contrast, an asynchronous action never pauses the backend or target program. An asynchronous action is generally used when the action has no effect on the future execution of the target program, such as when the action simply sends output strings that are meant to be forwarded to the frontend.

The above-noted backend counters may be implemented as integer variables that are maintained by the backend. These counters are generally separate from the target program variables and variables within actions. Backend counters are useful for communication between different actions. For instance, two actions may calculate the rates at which two distinct events occur, and a third action may compare the two rates and reset a target program variable if the two rates differ by more than a threshold value. The first two actions would write their respective rates to backend counters, the values of which would then be sent by the backend as input to the third action. Backend counters can also be used to store state information between different invocations of the same action if the action is designed to end execution shortly after being triggered.

Figure 7:
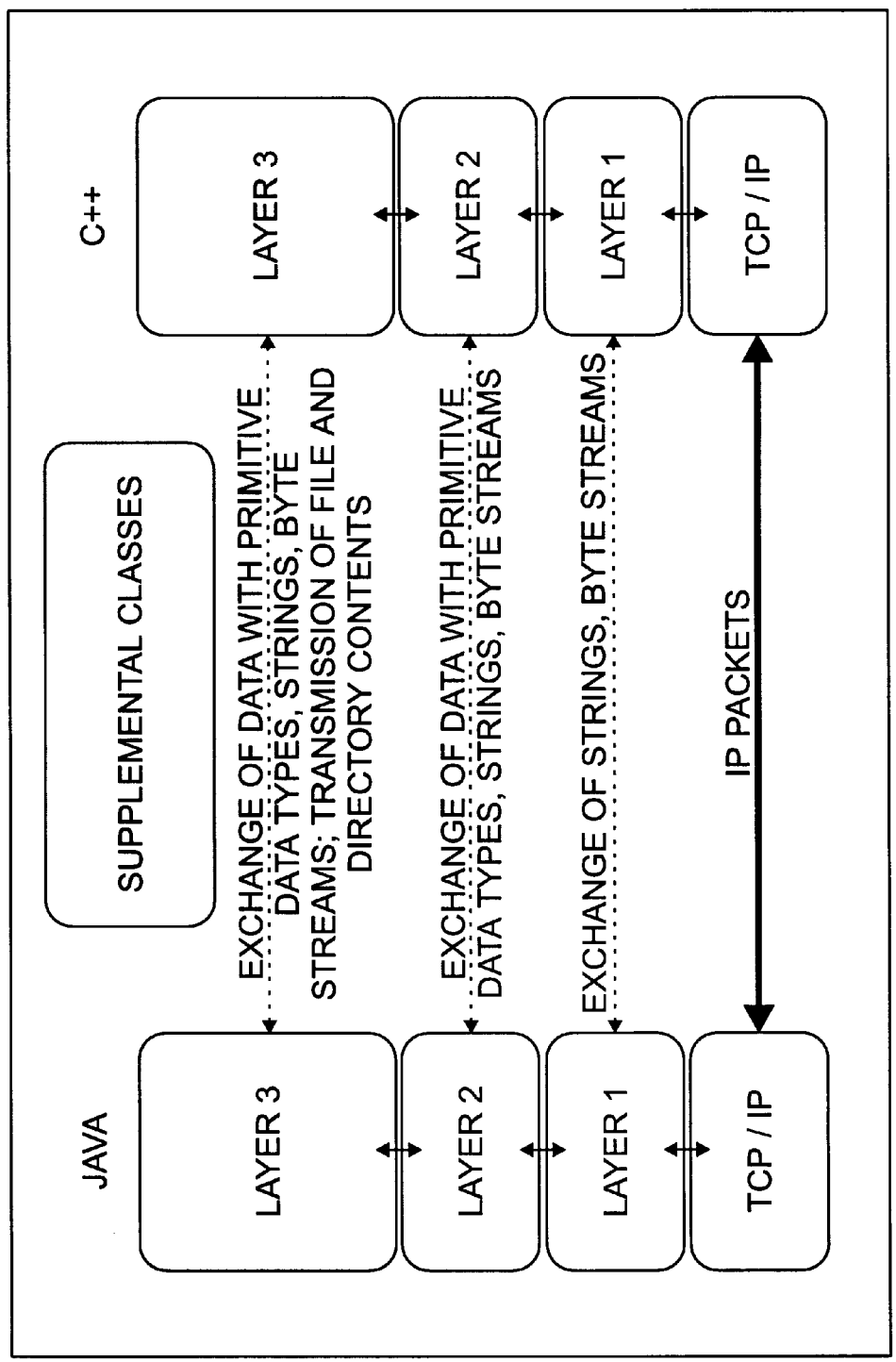
FIG. 7 illustrates the structure of an exemplary communications medium suitable for use in conjunction with the invention.

FIG. 7 illustrates an illustrative embodiment of the above-noted communication medium including web-embedded application layer 16 and TCP/IP layer 18. As noted above, the web-embedded application layer may be, for example, a Java/C++ class library designed for facilitating the implementation of communication between multiple Java frontends and a C++ backend of a web-embedded application. The medium may use TCP/IP stream sockets and high-level class wrappers for the sockets that allow Java programs and C++ backends to exchange data and files and access directories on the backend from the frontend. FIG. 7 shows an exemplary layered structure for the communication medium and illustrates the communication between different layers in a Java frontend and a C++ backend.

FIG. 8 illustrates an exemplary PCP command structure for use in the PCP element of the frontend 100 as shown FIG. 5. The use of PCP simplifies the communication between the frontend and the backend and facilitates the use of multiple frontends and backends. All PCP commands in this example are encoded as ASCII strings. The first space-delimited word in the string is always an integer command code that represents the purpose of the message. To allow for addition of commands in the future, command codes are categorized, with each category assigned to a specific range of codes as shown. Command codes 100–299 are assigned to the specification of breakpoint commands, with that range further subdivided into commands that set the location and characteristics of the breakpoint, e.g., whether the breakpoint is temporary, and those that specify actions to be taken whenever a breakpoint is encountered. Notification commands are sent by the backend to the frontend to indicate that an event has occurred or that a condition has been met. Acknowledgment commands are sent by the backend to the frontend to provide a more reliable mode of operation. The fault-tolerance commands are an example of a category of commands designed to support a particular application, i.e., the provision of fault tolerance.

An indirect instrumentation tool in accordance with the invention is capable of performing a variety of different software instrumentation tasks. A number of such tasks, each illustrating specific advantages of the invention, will be described below. The first task is the instrumentation of a web server to create an interactive GUI and to provide for application management for an actual target program. The second task is the addition of fault tolerance to a target program which has no inherent fault tolerance. The third task is the modification of target program functionality, which involves a change in the display format of a graphical clock program. This last task is performed without the use of any source code.

In the first example, a known target program is used to demonstrate how the invention can be used to gain observability into the data space of a process. The target program in this example is the Apache web server available from the Apache HTTP server project at URL http://www.apache.org/. Suppose we wanted to monitor the statistics that the Apache server collects. Apache can serve these statistics back to a privileged client, e.g., a browser, in HTML format when this client issues a request for the URL http://<host>:<port>/server_status to the server. However, this method does not allow the continuous and graphical display of the server statistics that we desire in this example. We therefore first identify the lines in the Apache code that update the server statistics. A file http_main.c in the Apache web server contains a function increment_counts with a structure new_score_rec whose fields get assigned the up-to-date statistical values that we are interested in and therefore contain the values we would like to display graphically. Assuming that we have an Apache executable with symbolic information, we can move on to the instrumentation of Apache to obtain the desired graphical user interface.

The instrumentation procedure begins with starting up the backend of the above-described instrumentation tool. The backend outputs the number of the port it uses for communicating with the frontend. We then start up the frontend applet (which provides the creation GUI 20) in a browser program. The frontend prompts us for the name of the machine that hosts the backend and for the backend port number. In a pull-down menu of the frontend creation GUI, we select a "Load Target Program" command, which requires us to type in the name of the Apache executable. This attaches the backend to the Apache Web server.

The next step is to request the list of all functions in the server code by selecting a "Request Function List"

command, which displays all functions including parameter and return value types in a designated area of the creation GUI. From this list, we pick the function increment_counts and request its source code as well as the list of its local variables via appropriate menu selections. The source code and the local variable list are then displayed in different areas of the creation GUI. In the function source code display, we select each line in which a variable that we would like to monitor is being updated, one at a time. For each line selection, we click on the name of the variable to be monitored in the list of local variables and finish the instrumentation of this line by associating a widget with it, in this case a meter widget. As described in conjunction with FIG. 4, a meter widget may be a horizontal bar whose length is proportional to the value of the associated variable. The widget along with appropriate labels is displayed in the created GUI as soon as it is selected. Eventually, we end up with one meter widget for each variable that we wish to monitor.

Finally, we start the execution of the Apache server by selecting a "Run" command in a creation GUI menu. Each widget in the created GUI now graphically displays the values of the statistics variables that we are interested in. The execution of the Apache server can be controlled to a certain extent by clicking on menu items in the created GUI. For example, control operations may be provided to allow the user to interrupt the server once or periodically, to resume execution, and to terminate or restart it.

Suppose we not only want to graphically monitor statistics variables but instead want to use these variables in a more active way. For example, we might want the backend to automatically send an email message to a remote server administrator after 10,000 client requests to the web server. To do this, we can write a shell script that sends a predetermined email to the address of the server administrator. Instead of only associating the source code line that updates new_score_rec.access count in function increment_counts with the meter widget, we can also associate this line with the shell script. In addition, we may specify the number of repeated executions of this line before we want the shell script to be invoked. When the Apache server runs under supervision of the backend, the execution of the shell script will be triggered by the backend each time the specified source code line has been executed 10,000 times.

In the previous example, the shell script is invoked every time it has to perform the desired action. Alternatively, a shell script may remain alive after it has completed a task and the backend can continue feeding data into the shell script. We can use this feature to extend the functionality of the target program in more complex ways, e.g., we can compute a moving average of connection attempts to the Apache server. To this end, the backend sends the value of new_score_rec.access_count to the shell script in certain time intervals. The script then computes the difference between its previously stored version of new_score_rec.access_count and the updated value, normalizes the difference over time, and sends this value to the backend, which forwards it to the frontend. There, the moving average of connection attempts can be displayed in a meter widget.

Another application of the invention is in the area of fault tolerance. In this example, the above-described indirect instrumentation tool is augmented to support the addition of fault tolerance capabilities to a target program which has no inherent fault tolerance. The most important aspects of fault tolerance are generally error detection and error recovery. Error detection is accomplished via replication of the target program on different machines, with each copy of the target program controlled by a separate backend. These backends communicate with a single frontend, which serves as a coordinator for the backends and as a voter to determine discrepancies among the target programs as they execute. Recovery from detected errors is accomplished via a modified checkpointing and restart mechanism. A detailed description of the use of indirect instrumentation for fault tolerance can be found in the the above-cited U.S. patent application Ser. No. 09/100,826 of Timothy K. Tsai entitled "Fault Tolerance via N-Modular Software Redundancy Using Indirect Instrumentation," which was filed concurrently herewith and is assigned to the assignee of the present invention.

An indirect instrumentation tool in accordance with the invention can also be used to implement target program modifications without requiring changes to source code. The following example demonstrates the modification of the functionality of a target program without the use of source code changes. The goal of this example is to modify the time output format of an xclock program, which is a graphical clock program that is distributed with the X Window graphical environment. The standard xclock program displays the time in only one default format, e.g., Sat Apr 11 20:28:03 EDT 1998. If another format is desired, e.g., Sat Apr 11 8:28:03 PM, then conventional techniques would require that the source code be modified and recompiled. However, with the indirect instrumentation tool of the invention, any run-time selectable time format can be added to the xclock program. The following steps may be used to accomplish this instrumentation. First, the virtual address for the time variable is found, which may require some investigative effort. The xclock program is then executed, and after waiting for the time to appear initially in the graphical output, a signal is sent to the xclock program to cause a core dump of its internal state. With the aid of a debugger, the memory space of the core dump is examined. A string search is conducted for the string representing the last lime displayed by the xclock graphical display. When this string is found, then the corresponding virtual address can be determined by calculating the offset of the string from the beginning of the data segment in the core dump. This virtual address is the same for subsequent executions of the xclock program.

Once the virtual address for the time variable is found, the user enters this virtual address into the frontend, which then instructs the backend to insert a watchpoint for that virtual address. Furthermore, for that watchpoint, a specific backend action is specified which alters the time format to an alternate format desired by the user. When the xclock program is executed under the control of the indirect instrumentation tool, the backend action will be executed when the time variable is updated by the xclock program, thus changing the graphical time output whenever the time is updated. Note that this is accomplished without the use of any source code and without the need to recompile the xclock program.

An indirect instrumentation tool in accordance with the invention can provide the foundation for many additional applications. These additional applications include real-time collaboration, process monitoring, software rejuvenation, addressing Year-2000 and similar problems, and graphical interface creation. Each of these additional applications will be described in turn below.

The above-described created GUI may be used to provide real-time collaboration. Examples of real-time collaboration include distributed software development and distributed real-time games. In these applications, several users exist. A separate creation GUI is available for each user to access the same target program. In the case of distributed software development, two or more developers on the same project but at different physical locations might want to collaborate. One of the developers would be able to graphically and interactively demonstrate to the other developers the operation of code. Such a capability would facilitate software development, debugging, and demonstration.

In process monitoring applications, indirect instrumentation in accordance with the invention offers observability into target program data space with instruction-level and function-level control of execution. This capability, coupled with the ability to perform user-specified actions that are triggered at specified points of execution, forms the basis for powerful process monitoring applications. The following are some exemplary applications based upon process monitoring: (1) traditional GUI, i.e., the creation of a graphical user interface in a convenient point-and-click manner; (2) traditional debugging (since the backend may be built on top of a debugger, the use of the creation GUI as a frontend to the debugger is a natural application); (3) run-time profiling (the traditional method of profiling involves the instrumentation of object code by direct alteration of the program's disk image, while the invention permits the indirect instrumentation of the target program without recompilation); (4) logging, e.g., it is also possible to create a GUI with no graphical widgets, such that only functional widgets that record the state of the target program are included; (5) time-triggered actions other than logging, e.g., gathering data to determine the time to perform software rejuvenation, or monitoring the amount of disk traffic and initiating additional disk cache flushing without altering the target program or the operating system.

Software rejuvenation is the process of avoiding program failures by interrupting program execution, checkpointing the program data space, and restarting the program from the checkpointed state. A challenging problem is to determine when and how often rejuvenation should occur to avoid program failure and yet with as little overhead as possible. To do this, we have to gather data regarding the running process and try to find out if the process has "aged" beyond a certain threshold, making the probability of a program malfunction exceed another threshold. The traditional rejuvenation methods typically do not take into consideration information about the internal state of the process and instead monitor operating system resources claimed by the process. Using indirect instrumentation, we can easily implement traditional software rejuvenation methods. However, indirect instrumentation also allows us to look at the internal state of the running process. The invention can thus be used to provide additional techniques for determining points of time when rejuvenation should occur and what part of the program data space has to be checkpointed.

Indirect instrumentation also can be used to provide a data-centric, dynamic solution to the Year-2000 problem. For example, instead of identifying defective code statements, possibly problematic data variables are identified. Then, the instrumentation tool is used to enable watchpoints for these variables, such that the target program is interrupted whenever the selected variables are accessed. When a watchpoint is activated, a user-specified action is performed to manipulate the state of the target program in a manner that will correct the program execution.

Indirect instrumentation can also provide an improved technique for graphical interface creation. Traditionally, graphical interfaces are created (1) by writing code based upon a graphical library or language, such as Motif or Tcl/Tk. as described in John K. Ousterhout, "Tcl and the Tk Toolkit," Addison-Wesley Professional Computing Series, Addison-Wesley, 1994, or (2) by using point-and-click techniques to generate graphical code, such as is used with the xforms package described in T. C. Zhao and Mark Overmars, "Forms Library: A Graphical User Interface Toolkit for X," 0.86 edition, March 1997. Even for packages such as xforms that attempt to automatically generate much of the graphical code, additional code must still be written to interface the graphical code with the functional code. With the indirect instrumentation of the invention, the need to write this interface or "glue" code is eliminated.

It should be noted that the above-described illustrative embodiments of the invention can be implemented in a variety of computing applications other than those mentioned above, including other distributed and non-distributed computing applications. These and numerous other alternative embodiments within the scope of the following claims will be readily apparent to those skilled in the art.

What is claimed is:

1. A method of providing software instrumentation in a computing system, the method comprising the steps of:

controlling the execution of a target program; and executing a user-specified instrumentation action upon occurrence of a user-specified event during execution of the target program, wherein the instrumentation action is implemented without modification of the target program code;

wherein the controlling and executing steps are implemented in a backend portion of an instrumentation tool, and wherein the instrumentation tool also includes a frontend portion providing a user interface in which the user specifies at least one of the instrumentation action and the event, the frontend and backend portions of the instrumentation tool being implemented in a distributed manner using at least two machines.

2. The method of claim 1 further including the steps of running the frontend portion on a first machine and running the backend portion on a second machine remote from the first machine.

3. The method of claim 1 wherein the frontend portion includes a creation graphical user interface having user-selectable instrumentation functions for providing instrumentation for the target program.

4. The method of claim 1 wherein the frontend portion further includes a created graphical user interface which is created by the user for providing selected instrumentation functions for the target program.

5. The method of claim 3 wherein the creation graphical user interface includes at least one of a source listing for at least a portion of the target program, a list of functions in the target program, a list of global variable in the target program and a list of local variables in the target program.

6. The method of claim 4 wherein the creation graphical user interface allows a user to select a variable in the target program for display in a created graphical interface of the frontend portion, and wherein the variable is updated using information supplied from the backend portion regarding the execution of the target program.

7. The method of claim 1 further including the step of running a debugger program in the backend portion.

8. The method of claim 1 further including the step of providing at least one counter in the backend portion for monitoring a characteristic of the user-specified action executed by the backend portion.

9. The method of claim 1 wherein the step of executing a user-specified instrumentation action further includes the step of executing at least one of the following actions: (i) altering execution of the target program; (ii) altering a value of a target program variable; (iii) sending output of the target program to the frontend portion; (iv) starting at least one additional program; (v) calculating a rate of occurrence for a given event relating to the target program; (vi) sending a message to the frontend portion when a given event relating to the target program occurs; and (vii) modifying a target program variable based on usage of a set of operating system resources.

10. The method of claim 1 wherein the step of executing a user-specified instrumentation action further includes the step of executing an action when at least one of the following triggers occurs: (i) an update of a target program variable; (ii) execution of a target program instruction; and (iii) expiration of a timer.

11. The method of claim 1 wherein the step of executing a user-specified instrumentation action further includes the step of outputting at least one of the following action outputs: (i) a string to be forwarded by the backend to the frontend; (ii) a command that updates the value of a backend counter; and (iii) a command that alters the execution of the target program.

12. The method of claim 1 further including the step of operating the instrumentation tool in an interactive mode in which a creation graphical user interface of the frontend portion requests information about the target program from the backend portion, and the backend portion supplies the requested information to a created graphical user interface of the frontend portion.

13. The method of claim 1 further including the step of operating the instrumentation tool in a stand-alone mode in which a created graphical user interface of the frontend portion, generated using a creation graphical user interface of the frontend portion, requests information about the target program from the backend portion, and receives the requested information from the backend portion.

14. An apparatus for providing software instrumentation in a computing system, the apparatus comprising:

a machine for running at least a portion of a software instrumentation tool, wherein the instrumentation tool is operative to control the execution of a target program, and to execute a user-specified instrumentation action upon occurrence of a user-specified event during execution of the target program, wherein the instrumentation action is implemented without modification of the target program code, and wherein the software instrumentation tool includes a backend portion for implementing the control and execute operations, and a frontend portion providing a user interface in which the user specifies at least one of the instrumentation action and the event, the frontend and backend portions of the software instrumentation tool being implemented in a distributed manner using at least two machines.

15. The apparatus of claim 14 wherein the frontend portion of the software instrumentation tool runs on a first machine and the backend portion runs on a second machine remote from the first machine.

16. The apparatus of claim 14 wherein the frontend portion includes a creation graphical user interface having user-selectable instrumentation functions for providing instrumentation for the target program.

17. The apparatus of claim 14 wherein the frontend portion further includes a created graphical user interface which is created by a user for providing selected instrumentation functions for the target program.

18. The apparatus of claim 16 wherein the creation graphical user interface includes at least one of a source listing for at least a portion of the target program, a list of functions in the target program, a list of global variables in the target program and a list of local variables in the target program.

19. The apparatus of claim 16 wherein the creation graphical user interface allows a user to select a variable in the target program for display in a created graphical interface of the frontend portion, and wherein the variable is updated using information supplied from the backend portion regarding the execution of the target program.

20. The apparatus of claim 14 wherein the backend portion includes a debugger program.

21. The apparatus of claim 14 wherein the backend portion is operative to provide at least one counter in the backend portion for monitoring a characteristic of the user-specified action executed by the backend portion.

22. A method of providing software instrumentation in a computing system, the method comprising the steps of:

running a frontend portion of a software instrumentation tool to provide a user interface for the instrumentation tool; and running a backend portion of the instrumentation tool using information generated by the frontend portion, wherein the backend portion includes a controller for controlling the operation of a target program, such that the target program can be instrumented without modifying target program code;

wherein the frontend and backend portions of the software instrumentation tool are implemented in a distributed manner using at least two machines.

23. An apparatus for providing software instrumentation in a computing system, the apparatus comprising:

a machine for running at least a frontend portion of a software instrumentation tool to provide a user interface for the instrumentation tool, wherein the instrumentation tool further includes a backend portion which includes a controller for controlling the operation of a target program, using information generated by the frontend portion, such that the target program can be instrumented without modifying target program code, wherein the frontend and backend portions of the software instrumentation tool are implemented in a distributed manner using at least two machines.

24. An apparatus for providing a software instrumentation tool in a computing system, the apparatus comprising:

a machine for running at least a backend portion of the instrumentation tool, wherein the frontend portion of the instrumentation tool provides a user interface to the instrumentation tool, and the backend portion includes a controller for controlling the operation of the target program, such that the target program can be instrumented without modifying target program code, and wherein the frontend and backend portions of the software instrumentation tool are implemented in a distributed manner using at least two machines.

25. An apparatus for providing software instrumentation in a computing system, the apparatus comprising:

means for controlling the execution of a target program; and means for executing a user-specified instrumentation action upon occurrence of a user-specified event during execution of the target program, wherein the instrumentation action is implemented without modification of the target program code;

wherein the controlling and executing means are implemented in a backend portion of an instrumentation tool, and wherein the instrumentation tool also includes a frontend portion providing a user interface in which the user specifies at least one of the instrumentation action and the event, the frontend and backend portions of the instrumentation tool being implemented in a distributed manner using at least two machines.

26. A machine-readable medium for storing one or more programs which when executed on a machine implement the steps of:

controlling the execution of a target program; and executing a user-specified instrumentation action upon occurrence of a user-specified event during execution of the target program, wherein the instrumentation action is implemented without modification of the target program code;

wherein the controlling and executing steps are implemented in a backend portion of an instrumentation tool, and wherein the instrumentation tool also includes a frontend portion providing a user interface in which the user specifies at least one of the instrumentation action and the event, the frontend and backend portions of the instrumentation tool being implemented in a distributed manner using at least two machines.

27. A method of providing software instrumentation in a computing system, the method comprising the steps of:

controlling the execution of a target program; and executing a user-specified instrumentation action upon occurrence of a user-specified event during execution of the target program, wherein the instrumentation action is implemented without modification of the target program code;

wherein the controlling and executing steps are implemented in a backend portion of an instrumentation tool, and wherein the instrumentation tool also includes a frontend portion providing a user interface in which the user specifies at least one of the instrumentation action and the event, and further wherein the step of executing a user-specified instrumentation action further includes the step of executing at least one of the following actions: (i) altering execution of the target program; (ii) altering a value of a target program variable; (iii) sending output of the target program to the frontend portion; (iv) starting at least one additional program; (v) calculating a rate of occurrence for a given event relating to the target program; (vi) sending a message to the frontend portion when a given event relating to the target program occurs; and (vii) modifying a target program variable based on usage of a set of operating system resources.

28. A method of providing software instrumentation in a computing system, the method comprising the steps of:

controlling the execution of a target program; and executing a user-specified instrumentation action upon occurrence of a user-specified event during execution of the target program, wherein the instrumentation action is implemented without modification of the target program code;

wherein the step of executing a user-specified instrumentation action further includes the step of executing an action when at least one of the following triggers occurs: (i) an update of a target program variable; (ii) execution of a target program instruction; and (iii) expiration of a timer.

29. A method of providing software instrumentation in a computing system, the method comprising the steps of:

controlling the execution of a target program; and executing a user-specified instrumentation action upon occurrence of a user-specified event during execution of the target program, wherein the instrumentation action is implemented without modification of the target program code;

wherein the controlling and executing steps are implemented in a backend portion of an instrumentation tool, and wherein the instrumentation tool also includes a frontend portion providing a user interface in which the user specifies at least one of the instrumentation action and the event, and further wherein the step of executing a user-specified instrumentation action further includes the step of outputting at least one of the following action outputs: (i) a string to be forwarded by the backend to the frontend; (ii) a command that updates the value of a backend counter; and (iii) a command that alters the execution of the target program.

30. A method of providing software instrumentation in a computing system, the method comprising the steps of:

controlling the execution of a target program; and executing a user-specified instrumentation action upon occurrence of a user-specified event during execution of the target program, wherein the instrumentation action is implemented without modification of the target program code;

wherein the controlling and executing steps are implemented in a backend portion of an instrumentation tool, and wherein the instrumentation tool also includes a frontend portion providing a user interface in which the user specifies at least one of the instrumentation action and the event, the method further including the step of operating the instrumentation tool in an interactive mode in which a creation graphical user interface of the frontend portion requests information about the target program from the backend portion, and the backend portion supplies the requested information to a created graphical user interface of the frontend portion.

31. A method of providing software instrumentation in a computing system, the method comprising the steps of:

controlling the execution of a target program; and executing a user-specified instrumentation action upon occurrence of a user-specified event during execution of the target program, wherein the instrumentation action is implemented without modification of the target program code;

wherein the controlling and executing steps are implemented in a backend portion of an instrumentation tool, and wherein the instrumentation tool also includes a frontend portion providing a user interface in which the user specifies at least one of the instrumentation action and the event, the method further including the step of operating the instrumentation tool in a stand-alone mode in which a created graphical user interface of the frontend portion, generated using a creation graphical user interface of the frontend portion, requests information about the target program from the backend portion, and receives the requested information from the backend portion.

32. An apparatus for providing software instrumentation in a computing system, the apparatus comprising:

a machine for running at least a portion of a software instrumentation tool, wherein the instrumentation tool is operative to control the execution of a target program, and to execute a user-specified instrumentation action upon occurrence of a user-specified event during execution of the target program, wherein the instrumentation action is implemented without modification of the target program code, and wherein the software instrumentation tool includes a backend portion for implementing the control and execute operations, and a frontend portion providing a user interface in which the user specifies at least one of the instrumentation action and the event, wherein the frontend portion includes a creation graphical user interface having user-selectable instrumentation functions for providing instrumentation for the target program, and further wherein the creation graphical user interface includes at least one of a source listing for at least a portion of the target program, a list of functions in the target program, a list of global variables in the target program and a list of local variables in the target program.

33. An apparatus for providing software instrumentation in a computing system, the apparatus comprising:

a machine for running at least a portion of a software instrumentation tool, wherein the instrumentation tool is operative to control the execution of a target program, and to execute a user-specified instrumentation action upon occurrence of a user-specified event during execution of the target program, wherein the instrumentation action is implemented without modification of the target program code, and wherein the software instrumentation tool includes a backend portion for implementing the control and execute operations, and a frontend portion providing a user interface in which the user specifies at least one of the instrumentation action and the event, wherein the frontend portion includes a creation graphical user interface having user-selectable instrumentation functions for providing instrumentation for the target program, and further wherein the creation graphical user interface allows a user to select a variable in the target program for display in a created graphical interface of the frontend portion, and wherein the variable is updated using information supplied from the backend portion regarding the execution of the target program.

* * * * *